(12) United States Patent
Kim et al.

(10) Patent No.: US 7,193,779 B2
(45) Date of Patent: Mar. 20, 2007

(54) FRONT FILTER IN PLASMA DISPLAY PANEL

(75) Inventors: Kyung Ku Kim, Seoul (KR); Hong Rae Cha, Seoul (KR); Young Sung Kim, Yongin-si (KR); Myeong Soo Chang, Woowang-si (KR); Byung Gil Ryu, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/778,367

(22) Filed: Feb. 12, 2004

(65) Prior Publication Data

US 2004/0165297 A1    Aug. 26, 2004

(30) Foreign Application Priority Data

Feb. 12, 2003    (KR)    ............ 10-2003-0008840

(51) Int. Cl.
*G02B 1/10*    (2006.01)
*H01J 29/88*    (2006.01)

(52) U.S. Cl. ............ 359/580; 313/479; 313/478

(58) Field of Classification Search ........ 359/580, 359/350, 356; 428/441; 313/479, 478, 489, 313/582; 442/16
See application file for complete search history.

(56) References Cited

U.S. PATENT DOCUMENTS

| 6,548,177 B2 * | 4/2003 | Hieda et al. ........... 428/441 |
| 6,833,665 B2 * | 12/2004 | Wachi et al. ........... 313/479 |
| 2003/0176124 A1 * | 9/2003 | Koike et al. ........... 442/16 |

\* cited by examiner

*Primary Examiner*—Audrey Y. Chang
(74) *Attorney, Agent, or Firm*—Lee, Hong, Degerman, Kang & Schmadeka

(57) ABSTRACT

Disclosed is a front filter in a plasma display panel (PDP), in which the front filter comprises an impact-absorbing layer attached to a front surface of the panel and composed of one of EVA, acrylic polymers, and PVC to be able to absorb external impacts.

11 Claims, 4 Drawing Sheets

80

| Antireflection coating | ~82 |
| Impact-absorbing layer | ~84 |
| Optical characteristic film | ~86 |
| EMI shielding film | ~88 |
| NIR blocking film | ~90 |
| PDP panel | ~32 |

30

| Antireflection coating | ~50 |
| Optical characteristic film | ~52 |
| Glass | ~54 |
| EMI shielding film | ~56 |
| NIR blocking film | ~58 |

| Antireflection coating | ~62 |
| --- | --- |
| Optical characteristic film | ~64 |
| EMI shielding film | ~66 |
| NIR blocking film | ~68 |

| Antireflection coating | ~82 |
| --- | --- |
| Impact-absorbing layer | ~84 |
| Optical characteristic film | ~86 |
| EMI shielding film | ~88 |
| NIR blocking film | ~90 |
| PDP panel | ~32 |

FRONT FILTER IN PLASMA DISPLAY PANEL

BACKGROUND OF THE INVENTION

1. Field of the Invention

The present invention relates in general to front filters in a plasma display panel, more particularly, to a front panel for improving durability of a plasma display panel.

2. Discussion of the Background Art

Principle of plasma display panel displays (hereinafter referred to as PDP) technology is that 147 nm-ultraviolet rays generated by discharge of different compositions of inert gas mixtures, such as, He+Xe, Ne+Xe or He+Ne+Xe, irradiate phosphors emitting in either red, green, or blue to display images including characters or graphics. The PDP technology is at mass production stage, and recent advances in PDP technologies made easier to manufacture thin PDPs and to provide much improved picture quality. Especially, in case of a three-electrode surface discharge type PDP, charge particles formed by discharge (i.e. wall charge) are stacked on the surface, which in turn protect electrodes from sputtering originated by discharge. Thus, the three-electrode surface discharge type PDP is known for low consumption of voltage and long lifespan.

FIG. 1 is a perspective view of the structure of a discharge cell in a related art PDP.

Referring to FIG. 1, the discharge cell of the related art PDP adopting the three-electrode surface discharge type structure includes a scan electrode (Y) and a sustain electrode (Z) formed on an upper substrate 10, and an address electrode (X) formed on a lower substrate 18. The scan electrode (Y) and the sustain electrode (Z) respectively includes transparent electrodes (12Y and 12Z), and metal bus electrodes (13Y and 13Z) formed on an edge of the transparent electrodes (12Y and 12Z) and having a smaller line width than that of the transparent electrodes (12Y and 12Z).

In general, the transparent electrodes (12Y and 12Z) are composed of Indium-Tin-Oxide (ITO) and formed on the upper substrate 10. The metal bus electrodes (13Y and 13Z) are typically made of chrome (Cr) and formed on the transparent electrodes (12Y and 12Z), reducing voltage drop caused by the highly resistive transparent electrodes (12Y and 12Z). Also, an upper dielectric layer 14 and a protective film 16 are layered on the upper substrate 10 on which the scan electrode (Y) and the sustain electrode (Z) are formed side by side. The charge particles formed by discharge (i.e. wall charge) are stacked on this upper dielectric layer 14. The protective film 16 protects the upper dielectric layer. 14 from damages caused by sputtering during plasma discharge, and increases ejection rate of secondary electrons. Usually magnesium oxide (MgO) is used for the protective film 16.

On the lower substrate 18 on which the address electrode (X is formed is a lower dielectric layer 22 and a barrier rib 24. Surfaces of the lower dielectric layer 22 and the barrier rib 24 are coated with a phosphor layer 26. The address electrode (X) is formed at right angles to the scan electrode (Y) and the sustain electrode (Z). The barrier rib 24 is formed in a strip or lattice pattern, and prevents ultraviolet rays and visible rays generated by discharge from leaking by an adjacent discharge cell. The phosphor layer 26 is excited by ultraviolet rays generated by plasma discharge, and generates one of visible rays in red, blue, or blue. The mixed inert gas is injected to discharge space formed in between the upper/lower substrate 10, 18 and the barrier rib 24.

To obtain continuous-tone images, each frame of PDP is divided into a plurality of subfields with different frequencies of the radiation in time-sharing system. Each subfield is composed of three parts: a reset period for resetting the full screen, an address period for selecting a scan line and for selecting a cell among the selected scan line, and a sustain period for display images in gray scales according to the frequency of discharge.

For instance, suppose that an images needs to be displayed in 256 gray scales. Then, as shown in FIG. 2, a frame period (16.67 ms) corresponding to $\frac{1}{60}$ sec is divided into 8 subfields (SF1 through SF8). As described above, each of these eight subfields (SF1 through SF8) is composed of three parts, namely the reset period, the address period, and the sustain period. The reset and address periods of each subfield are same for each subfield, but the sustain period of each subfield is exponentially increased at the rate of $2^n$ (n=0, 1, 2, 3, 4, 5, 6, 7).

Moreover, a front filter is installed at the upper substrate 10 of the PDP, to shield electromagnetic wave and to prevent reflection of external light.

FIG. 3 is a cross-sectional view of one side of a related art PDP.

Referring to FIG. 3, the related art PDP includes a panel 32 for which an upper substrate and a lower substrate are tightly adhered to each other, a front filter 30 installed at the front surface of the panel 32, a heat radiation plate 34 installed at the rear surface of the panel 32, a printed circuit substrate 36 attached to the heat radiation plate 34, a back cover 38 for compassing the rear surface of the PDP, a filter supporting part 40 for connecting the front filter 30 to the back cover 38, and a bearing member 42 installed in between the front filter 30 and the back cover 38 to compass the filter supporting part 40.

The printed circuit substrate 36 sends actuation signals to the electrodes of the panel 32. To this end, the printed circuit substrate 36 is mounted with diverse driving parts that are not shown in FIG. 3. The panel 32, in response to the actuation signal provided from the printed circuit substrate 36, displays a desired image. The heat radiation plate 34 radiates heat generated from the panel 32 and the printed circuit substrate 36. The back cover 38 protects the panel 32 from external impacts, and blocks ElectroMagnetic Interference (hereinafter referred to as EMI) in the rear surface.

The filter supporting part 40 electrically connects the front filter 30 to the back cover 38. In other words, the filter supporting part 40 earths the front filter 30 to the back cover 38, and prevents an occurrence of EMI on the side. The bearing member 42 bears the filter supporting part 40, the front filter 30, and the back cover 38.

The front filter 30 not only shields EMI but also prevents the reflection of external light. To this end, as shown in FIG. 5, the front filter 30 includes an antireflection coating 50, an optical characteristic film 52, a glass 54, an EMI shielding film 56, and a near infrared rays (hereinafter referred to as NIR) blocking film 58. In reality, an adhesive intermediate film is formed in between adjacent films (50, 52, 54, 56, and 58) of the front filter 30.

In addition, the optical characteristic film 52 is not usually an independent separate layer as shown in the drawing. Instead, the optical characteristic film 52 is formed by infusing a specific material to the adhesive intermediate film.

The structure of the front filter 30 is slightly different, depending on which manufacturer produces the front filter. For the convenience of description of the invention, the adhesive intermediate film is not illustrated in the drawings.

However, the optical characteristic film 52 is well illustrated as a separate layer, and the structure of the front filter 30 is the one currently being used in the PDP.

The antireflection coating 50 prevents the reflection of an incident light from outside and thus, improves contrast of images on the PDP. The antireflection coating 50 is formed on the surface of the front filter 30. In some cases, the antireflection coating 50 can be formed additionally on the rear surface of the front filter 30 as well. The optical characteristic film 52 reduces the brightness of red (R) and green (G) rays among incident light from the panel 32 but increases the brightness of blue (B) ray, thereby improving optical characteristics of the PDP.

The glass 54 protects the front filter 30 from external impacts. In other words, the glass 54 supports the front filter 30 in order to prevent the front filter 30 and the filter 32 from being damaged by external impacts. The EMI shielding film 56 shields EMI, and prevents the ejection of EMI incidented from the panel 32 to the outside. The NIR blocking film 58 blocks NIR radiation from the panel 32, and using an IR like a remote controller, helps signal-transmitting devices to able to do their work as normally by preventing an excess of the ejection of NIR to the outside more than what is required. In the meantime, the EMI shielding film 56 and the NIR blocking film 58 can be integrated together, instead of being separate layers.

The above described front filter 30 is then electrically connected to the back cover 38 through the filter supporting part 40. To be more specific, the filter supporting part 40 is connected to the both components in such manner that it covers from one end of the front filter 30 to the rear surface of the front filter 30. Here, the filter supporting part 40 is electrically connected to at least one of the EMI shielding film 56 and the NIR blocking film 58. That is, by earthing the front filter 30 to the back cover 38, the filter supporting part 40 can shield the EMI and/or NIR effects.

Therefore, the glass 54 in the related art front filter 30 serves to protect the front filter 30 from external impacts. However, one of disadvantages of using the glass 54 is that the thickness of the front filter 30 with the glass 54 is increased. In addition, when the glass 54 is inserted to the front filter 30, total weight and cost of manufacture are increased.

To resolve the above problems, a film type front filter 60 without the glass 54 is newly introduced, as depicted in FIG. 6. The film type front filter 60 includes an antireflection coating 62, an optical characteristic film 64, an EMI shielding film 66, and an NIR blocking film 68. An adhesive intermediate layer is formed in between adjacent films 62, 64, 66, and 68 of the film type front filter 60 to adhere the films to one another. In general, the optical characteristic film 60 is not a separate layer, but formed by infusing a specific material to the adhesive intermediate layer. The structure of the front filter 60 is slightly different, depending on which manufacturer produces the front filter 60. For the convenience of description of the invention, the adhesive intermediate film is not illustrated in the drawings. However, the optical characteristic film 64 is shown as a separate layer.

The antireflection coating 62 is formed on the surface of the film type front filter 60, and prevents the reflection of an external incident light back to the outside. The optical characteristic film 64 dims down red (R) and green (G) rays among incident light from the panel 32 but increases the brightness of blue (B) ray, thereby improving optical characteristics of the PDP.

The EMI shielding film 66 shields EMI, and prevents the ejection of EMI incidented from the panel 32 to the outside. The EMI shielding film 66 can be integrated with the NIR blocking film 68 which will be discussed next.

The NIR blocking film 66 blocks the incidence of NIR from the panel 32. Here, NIR has a wavelength of 700–1200 nm, and is generated by Xe that emits 800–1000 nm rays during the discharge of mixed inert gases filled in the PDP panel. When the NIR is ejected to the outside, signal-transmitting devices like a remote controller for transmitting signals via IR do not work. As a result, signals cannot be transmitted to the PDP any more. That is to say, the ejection of the NIR causes malfunction of the remote controller. Hence, the NIR blocking film 68 made of NIR absorbing materials (or colorant) prevents an excess of the ejection of NIR to the outside more than what is required, to ensure that signals from the remote controller for example are properly transmitted to the panel 32.

The merits of the film type front filter 60 are that the film type front filter without the glass 54 is lighter and thinner than the front filter with the glass 54. Also, the film type front filter 60 can reduce cost of manufacture by not using the glass 54.

However, the film type front filter 60 without the glass 54, i.e. a tempered glass, is very susceptive to damages from external impacts, and this results in a much higher possibility to cause serious damages on the screen than to the front filter with the glass 54.

SUMMARY OF THE INVENTION

An object of the invention is to solve at least the above problems and/or disadvantages and to provide at least the advantages described hereinafter.

Accordingly, one object of the present invention is to solve the foregoing problems by providing a film type front filter for reinforcing durability of a plasma display panel.

The foregoing and other objects and advantages are realized by providing a front filter including a front filter including: a panel; and an impact-absorbing layer attached to a front surface of the panel and absorbing external impacts.

In an embodiment of the invention, the front filter further comprises an antireflection coating for reducing reflection of light, an optical characteristic layer for improving optical characteristics of incident rays from the panel, an EMI (electromagnetic interference) shielding film for shielding incident electromagnetic waves incidented from the panel; and an NIR (near infrared rays) blocking film for blocking incident near rays from the panel.

In an embodiment of the invention, the impact-absorbing layer is made of a film, and being attached in between the films.

In an embodiment of the invention, the impact-absorbing layer is fabricated in form of an adhesive or a cohesion agent, and infused in between the films.

In an embodiment of the invention, the impact-absorbing layer is composed of one of polymer materials out of transparent material EVA, acrylic polymers and PVC.

In an embodiment of the invention, the impact-absorbing layer has a thickness of 500 µm–5 mm.

Another aspect of the invention provides a front filter in a plasma display panel, wherein the front filter comprises an impact-absorbing layer attached to a front surface of the panel and composed of one of EVA, acrylic polymers, and PVC to be able to absorb external impacts.

In an embodiment of the invention, the impact-absorbing layer has a thickness of 500 µm–5 mm.

In an embodiment of the invention, the impact-absorbing layer is a film type.

In an embodiment of the invention, the impact-absorbing layer is applied in form of an adhesive or a cohesion agent.

In an embodiment of the invention, the front filter further comprises an antireflection coating for reducing reflection of light, an optical characteristic layer for improving optical characteristics of incident rays from the panel, an EMI (electromagnetic interference) shielding film for shielding incident electromagnetic waves incidented from the panel; and an NIR (near infrared rays) blocking film for blocking incident near rays from the panel.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 6 is a cross-sectional view of a related art film type front filter; and

FIG. 7 is a cross-sectional view of a front filter according to the present invention.

DETAILED DESCRIPTION OF PREFERRED EMBODIMENTS

Figure 1:
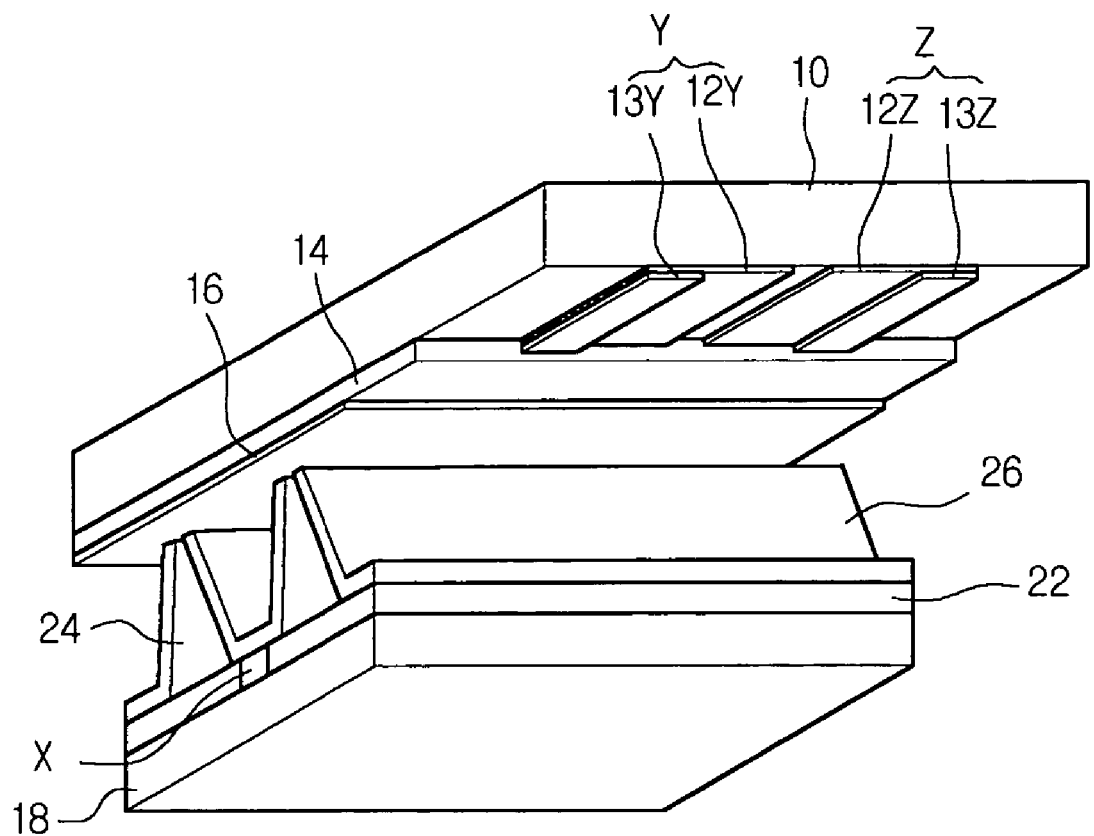
FIG. 1 is a perspective view of the structure of a discharge cell in a related art PDP.
Figure 2:
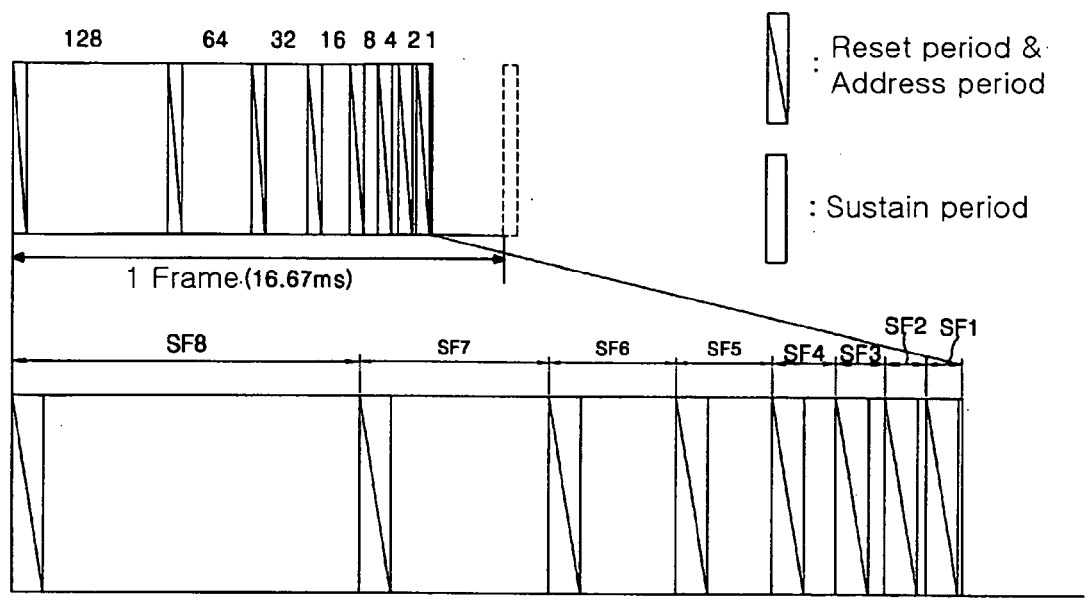
FIG. 2 illustrates a frame in 256 gray scales for used in a related art plasma display panel.
Figure 3:
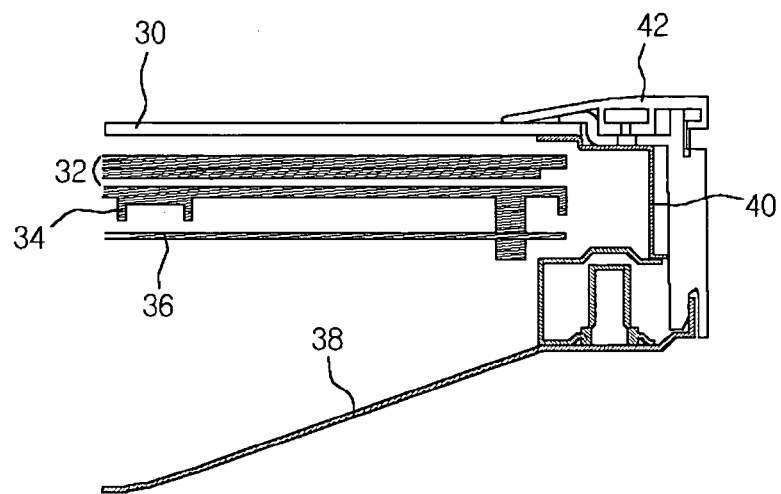
FIG. 3 is a cross-sectional view of one side of a related art PDP.
Figures 4, 5:
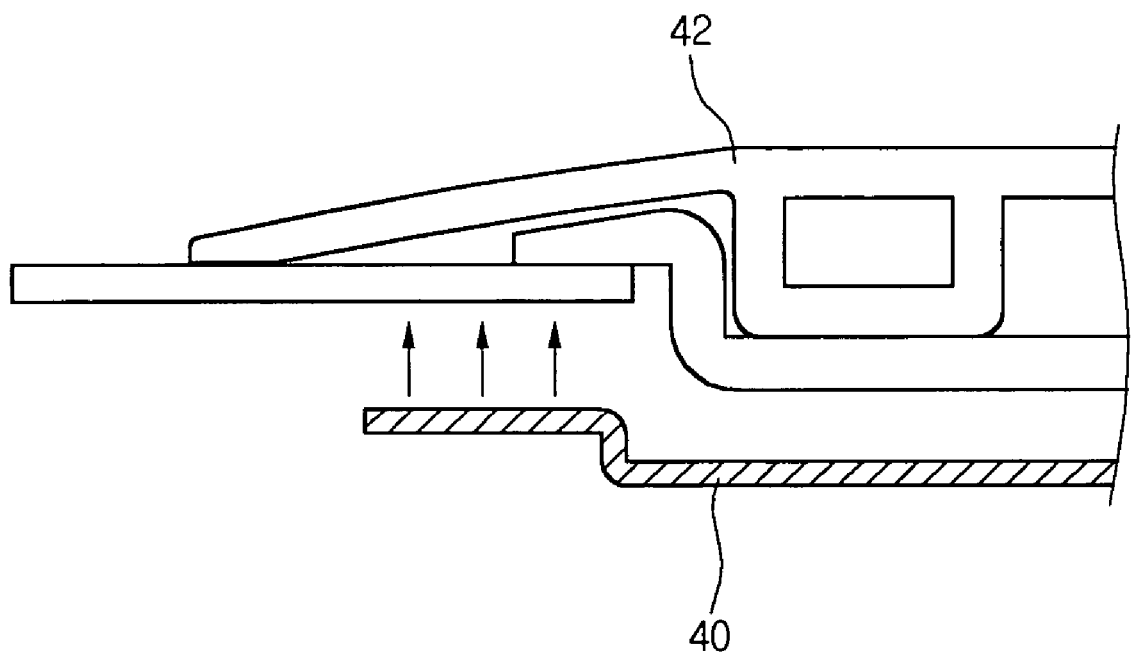
FIG. 4 is a cross-sectional view of the front filter in FIG. 3.
FIG. 5 is a detailed exploded view illustrating an earthing process on the front filter in FIG. 3 and a filter supporting part.

The following detailed description will present a film type front filter for a plasma display panel according to a preferred embodiment of the invention in reference to the accompanying drawings.

FIG. 7 is a cross-sectional view of the front filter in a plasma display panel (PDP) according to the present invention.

Referring to FIG. 7, the film type front filter 80 includes an antireflection coating 82, an optical characteristic film 86, an EMI shielding film 88, an NIR blocking film 90, and an impact-absorbing layer 84. An adhesive intermediate layer is formed in between adjacent films 82, 84, 86, 88, and 90 of the film type front filter 80 and in between the panel 32 and the films, thereby adhering them together. In general, the optical characteristic film 86 is not a separate layer, but formed by infusing a specific material to the adhesive intermediate layer. The structure of the front filter 80 is slightly different, depending on which manufacturer produces the front filter 60. For the convenience of description of the invention, the adhesive intermediate film is not illustrated in the drawings. However, the optical characteristic film 86 and the NIR blocking film 90 are shown as separate layers.

The antireflection coating 82 is formed on the surface of the film type front filter 80, and prevents the reflection of an external incident light back to the outside. The antireflection coating 82 can be formed additionally on the rear surface of the film type front filter 80.

The optical characteristic film 86 dims down red (R) and green (G) rays among incident light from the panel 32 but increases the brightness of blue (B) ray, thereby improving optical characteristics of the PDP.

The EMI shielding film 88 shields EMI, and prevents the ejection of EMI incidented from the panel 32 to the outside. The EMI shielding film 88 can be integrated with the NIR blocking film 90 which will be discussed next.

The NIR blocking film 90 blocks the incidence of NIR from the panel 32. Here, NIR has a wavelength of 700–1200 nm, and is generated by Xe that emits 800–1000 nm rays during the discharge of mixed inert gases filled in the PDP panel. When the NIR is ejected to the outside, signal-transmitting devices like a remote controller for transmitting signals via IR do not work. As a result, signals cannot be transmitted to the PDP any more. That is to say, the ejection of the NIR causes malfunction of the remote controller. Hence, the NIR blocking film 90 made of NIR absorbing materials (or colorant) prevents an excess of the ejection of NIR to the outside more than what is required, to ensure that signals from the remote controller for example are properly transmitted to the panel 32.

The impact-absorbing layer 84 is a separate film, and either it is attached to other films 82, 86, 88, and 90, or it can be manufactured in form of an adhesive or a cohesion agent to be infused in between adjacent films 82, 86, 88, and 90. The impact-absorbing layer 84 can be made of various polymer materials, e.g., transparent material EVA, acrylic polymers, or PVC, and has a thickness of 500 µm–5 mm.

Basically, the impact-absorbing layer of the film type front filter improves a breaking strength of the screen display by absorbing external impacts.

In other words, the impact-absorbing layer plays a role as a tempered glass used in the related art front filter with a glass. It prevents deterioration of breaking strength of the screen display, which in fact is one of defects of the related art film type front filter, and thus improves durability of the film type front filter.

As discussed above, the film type front filter with the impact-absorbing layer of the present invention can reduce possible damages on the display caused by external impacts, and improve breaking strength of the panel.

As a result, the impact-absorbing layer adapted to the film type front filter according to the invention plays a role as the tempered glass used in the related art front filter with the glass. In this manner, it is possible to obviate problems like deteriorations in breaking strength of the screen display, which is known as one of defects of the related art film type front filter, and to improve durability of the film type front filter.

While the invention has been shown and described with reference to certain preferred embodiments thereof, it will be understood by those skilled in the art that various changes in form and details may be made therein without departing from the spirit and scope of the invention as defined by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A front filter for a display panel, the front filter comprising:
a near infrared blocking film formed directly on a front surface of the display panel for blocking near infrared light rays emerging from the display panel;
an electromagnetic interference shielding film formed on the near infrared blocking film for blocking electromagnetic interference rays emerging from the display panel;
an optical characteristic film formed on the electromagnetic interference shielding film for selectively filtering light rays emitted from the display panel, wherein the optical characteristic film decreases intensity of red and green rays among incident light emitted from the display panel, and increases intensity of blue rays emitted from the display panel;
an impact-absorbing layer formed on the optical characteristic film for improving optical characteristics of incident rays emitted from the display panel; and
an antireflection coating formed on the impact-absorbing layer to prevent incident light rays being reflected from the display panel.

2. The front filter according to claim 1, wherein the impact-absorbing layer is fabricated as an adhesive or a cohesion agent, and infused between the optical characteristic film and the antireflection coating.

3. The front filter according to claim 1, wherein the impact-absorbing layer is composed of a film type.

4. The front filter according to claim 1, wherein the impact-absorbing layer has a thickness selected from the range of approximately 500 µm to approximately 5000 µm.

5. The front filter according to claim 1, wherein the display panel is a plasma display panel, and wherein the impact-absorbing layer is composed of transparent polymer material selected from the group consisting of: an EVA, an acrylic polymer, and a PVC.

6. The front filter according to claim 5, wherein the impact-absorbing layer has a thickness selected from the range of approximately 500 µm to approximately 5000 µm.

7. The front filter according to claim 5, wherein the impact-absorbing layer is infused between the optical characteristic film and the antireflection coating.

8. The front filter according to claim 5, wherein the impact-absorbing layer is applied to the optical characteristic film in form of an adhesive or a cohesion agent.

9. A front filter for a display panel, the front filter comprising:
a near infrared blocking film formed directly on the display panel for blocking excess near infrared light rays emerging from the display panel;
an electromagnetic interference shielding film formed on the near infrared blocking film for blocking light rays emerging from the display panel to outside the display panel;
an optical characteristic film formed on the electromagnetic interference shielding film, wherein the optical characteristic film dims the level of red and green light rays emitted by the display panel and to increase the level of brightness of blue light emitted by the display panel;
an impact-absorbing layer formed on the optical characteristic film, wherein the impact-absorbing layer is selected from the group of transparent polymer materials consisting of: an EVA, an acrylic polymer and PVC; and
an antirefleetion coating formed on the impact-absorbing layer to prevent reflection of external light arriving from the display panel.

10. A front filter for a display panel, the front filter comprising:
a near infrared blocking film disposed directly on the display panel for blocking excess near infrared light rays emerging from the display panel;
a first impact-absorbing layer formed on the near infrared blocking film;
an electromagnetic interference shielding film formed on the first impact-absorbing layer for blocking film light rays emerging from the display panel to outside the display panel;
a second impact-absorbing layer formed on the electromagnetic interference shielding film;
a optical characteristic film formed on the second impact-absorbing layer for selectively filtering light rays emitted from the display panel;
a third impact-absorbing layer formed on the optical characteristic film; and
an antireflection coating disposed on the third impact-absorbing layer to prevent reflection of external light arriving from the display panel.

11. The front filter according to claim 10, wherein the optical characteristic film decreases intensity of red and green rays among incident light from the display panel, and increases intensity of blue ray emitted from the display panel.

* * * * *